US008630662B2

(12) United States Patent
Herz (10) Patent No.: US 8,630,662 B2
(45) Date of Patent: *Jan. 14, 2014

(54) LOCATION SPECIFIC ICONS (75) Inventor: Scott Herz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,932

(22) Filed: Aug. 31, 2012

(65) Prior Publication Data

US 2013/0115916 A1    May 9, 2013

Related U.S. Application Data (63) Continuation of application No. 12/270,814, filed on Nov. 13, 2008, now Pat. No. 8,260,320.

(51) Int. Cl.
*H04W 24/00* (2009.01)

(52) U.S. Cl.
USPC ............... 455/456.3; 455/456.1; 455/456.2

(58) Field of Classification Search
USPC ................... 455/456.1, 456.2, 456.3
See application file for complete search history.

(56) References Cited

U.S. PATENT DOCUMENTS

| 7,353,034 | B2 | 4/2008 | Haney |
| 7,620,404 | B2 | 11/2009 | Chesnais et al. |
| 2005/0114021 | A1 | 5/2005 | Krull et al. |
| 2006/0072542 | A1* | 4/2006 | Sinnreich et al. ............. 370/351 |
| 2006/0293083 | A1 | 12/2006 | Bowen |
| 2007/0010942 | A1 | 1/2007 | Bill |
| 2007/0042790 | A1 | 2/2007 | Mohi et al. |
| 2007/0184855 | A1 | 8/2007 | Klassen et al. |
| 2007/0200713 | A1 | 8/2007 | Weber et al. |
| 2007/0204218 | A1 | 8/2007 | Weber et al. |
| 2007/0229549 | A1 | 10/2007 | Dicke et al. |
| 2007/0271328 | A1 | 11/2007 | Geelen et al. |
| 2008/0132252 | A1 | 6/2008 | Altman et al. |
| 2009/0005981 | A1 | 1/2009 | Forstall et al. |

FOREIGN PATENT DOCUMENTS

| EP | 0 908 835 | 4/1999 |
| JP | 2004219146 | 8/2004 |

OTHER PUBLICATIONS

Binzhuo et al., "Mobile Phone GIS Based on Mobile SVG", IEEE 2005.

* cited by examiner

*Primary Examiner* — Rafael Pérez-Gutiérrez
*Assistant Examiner* — Joshua Schwartz
(74) *Attorney, Agent, or Firm* — Fish & Richardson P.C.

(57) ABSTRACT

Systems, methods, and computer program products communicate location information associated with a device, such as a mobile device, to a server. Content identified by the server is received at the device, from the server and/or from a content service. The content can include an application associated with the location information. The content received at the device is displayed on the device only while the device is at or near a particular location identified by the location information.

18 Claims, 7 Drawing Sheets

LOCATION SPECIFIC ICONS

CROSS-REFERENCE TO RELATED APPLICATIONS

This application is a continuation of U.S. patent application Ser. No. 12/270,814, filed on Nov. 13, 2008, the entire contents of which are hereby incorporated by reference.

BACKGROUND

This disclosure relates to location specific content on a mobile device.

Mobile devices have grown more powerful and feature-rich and now include such features as personal digital assistant (PDA) capabilities, cameras, Internet access, Wi-Fi access, etc. Software applications may be stored and/or run on mobile devices in the same or similar manner as such applications are run on laptop or desktop computers. Unlike conventional cumbersome computers, the mobility of such devices enables applications that provide features based on the mobility of such devices. For instance, location-based services have been developed for determining and tracking the locations of users of mobile devices.

Location-based services provide location-specific information to mobile devices. For instance, a mobile device user can use a mapping program and global positioning system (GPS) data to identify the location of the mobile device on a map of a geographic region. Use of mapping software requires that the software be previously installed on the device such that it is operable in any location.

Despite the mobile nature of such devices, and the ability of such devices to know their location and/or access networks (e.g., via public or private Wi-Fi), users are still restricted to applications that are installed on the device, or which the user has decided to install for permanent use.

SUMMARY

In one aspect, systems, methods, apparatuses and computer program products are provided that enable content, such as applications, to appear and disappear on a mobile device depending on the presence of a mobile device within a Wi-Fi network, and/or based on a location of the device.

In one aspect, methods are disclosed, which include steps such as: communicating location information associated with a device to a server; receiving at the device content identified by the server, the content comprising an application associated with the location information; and presenting the received content on a display of the device only while the device is at or near a particular location identified by the location information.

According to some features, the method can include removing the presentation of the content when the device is no longer at or near the particular location. Receiving the content can include receiving the content from a content service, the content service identified by the server. Alternatively or additionally, the content can be received from the server. According to another feature, the content identified by the server can include a uniform resource locator (URL), a web clip, or an application. The application can be associated with the particular location. The location information can be identified and/or received from a positioning system. The positioning system can: derive the location information from satellite data received from a plurality of satellites, use dead reckoning to derive the location information; or use a wireless signal strength of the device to derive the location information. According to yet another feature, the location information can be identified by communication of the mobile device with a wireless access point.

In another aspect, methods are disclosed, which include steps such as: receiving, at a mobile device, beacon data from a wireless access point, wherein the beacon data comprises a URL; when the mobile device is within a range of the wireless access point, presenting content on the mobile device associated with the URL; and upon user selection of the content, receiving an application for execution on the mobile device.

According to some features, the method can include executing the application. The application, in some features, may be executed only if the mobile device is within the geographical range of the wireless access point. According to another feature, the method can include receiving the user selection at the mobile device. According to yet another feature, the method can include removing the content presentation when the mobile device is no longer within the range of the wireless access point. The wireless access point can include a Wi-Fi access point. Receiving an application can include receiving an application from a content service, and/ or from the wireless access point. The application can include a web clip.

In yet another aspect, a system is disclosed. The system includes: a positioning system operable to derive location information associated with a device; a location mapping service operable to store content associated with one or more locations of the device; a communications interface operable to communicate location information associated with the device to a server, the communications interface being further operable to receive at least some of the content from the server based on the location information; and a user interface operable to present the received content on the device when the device is at or near a location identified by the location information.

According to a feature, the content includes a URL or a web clip. The content can alternatively or additionally include video content, picture content, audio content, multimedia content or routing content associated with a geographical area within a proximate distance to the device based on the location information. According to another feature, the user interface is operable to present the received content on the device only when the device is at or near a location identified by the location information. The location information can be identified and/or received from a positioning system. The positioning system can: derive the location information from satellite data received from a plurality of satellites, use dead reckoning to derive the location information; or use a wireless signal strength of the device to derive the location information.

According to still another aspect, a system is disclosed. The system includes: a wireless access point, the wireless access point transmitting beacon data comprising a URL; a mobile device operable to receive the beacon data when the mobile device is within a range of the wireless access point; and a user interface operable to display content on the mobile device, the content associated with the URL.

According to a feature, the system can also include an application for execution on the mobile device upon user selection of the content. The content can include a URL, a web clip, video content, picture content, audio content, multimedia content, and/or routing content associated with a geographical area within a proximate distance to the device based on the location information. According to another feature, the user interface is operable to display the content on the mobile device only when the mobile device is at or near the wireless access point.

Systems, methods and computer program products enable content, such as applications, to automatically appear and disappear on a mobile device depending on the location of the device. This permits a user to view and/or interact with applications associated with a particular location. As an example, a user who enters a library with a mobile device may be presented with an application on the device that enables the user to search the library's digital card catalog. Upon exiting the library the application may be automatically removed such that the application is not permanent on the user's mobile device. These features enable the mobile device to make applications available when and where they are most useful to users.

DETAILED DESCRIPTION

Figure 1:
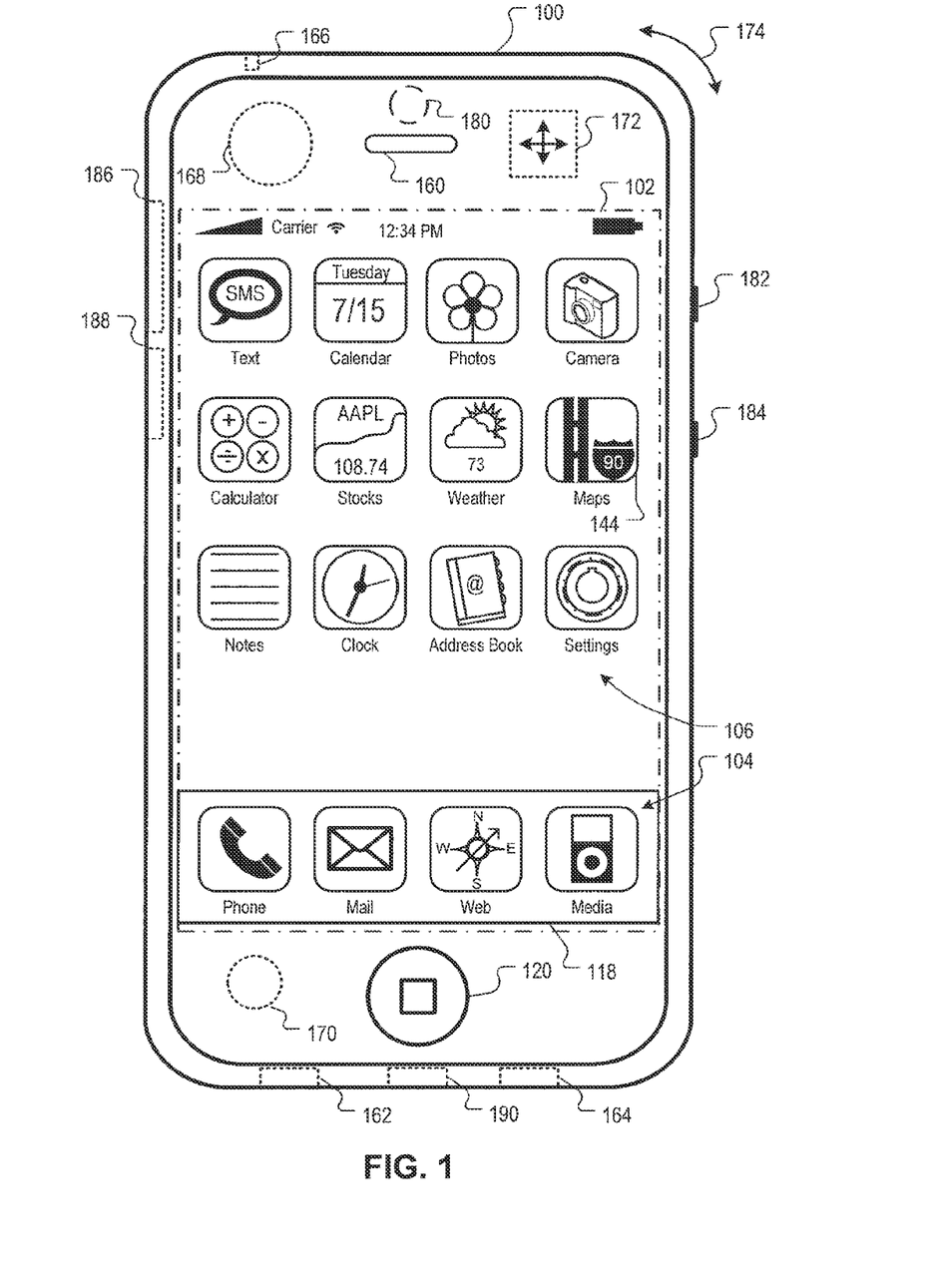
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Exemplary Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as a 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used.

Network Operating Environment

Figure 2:
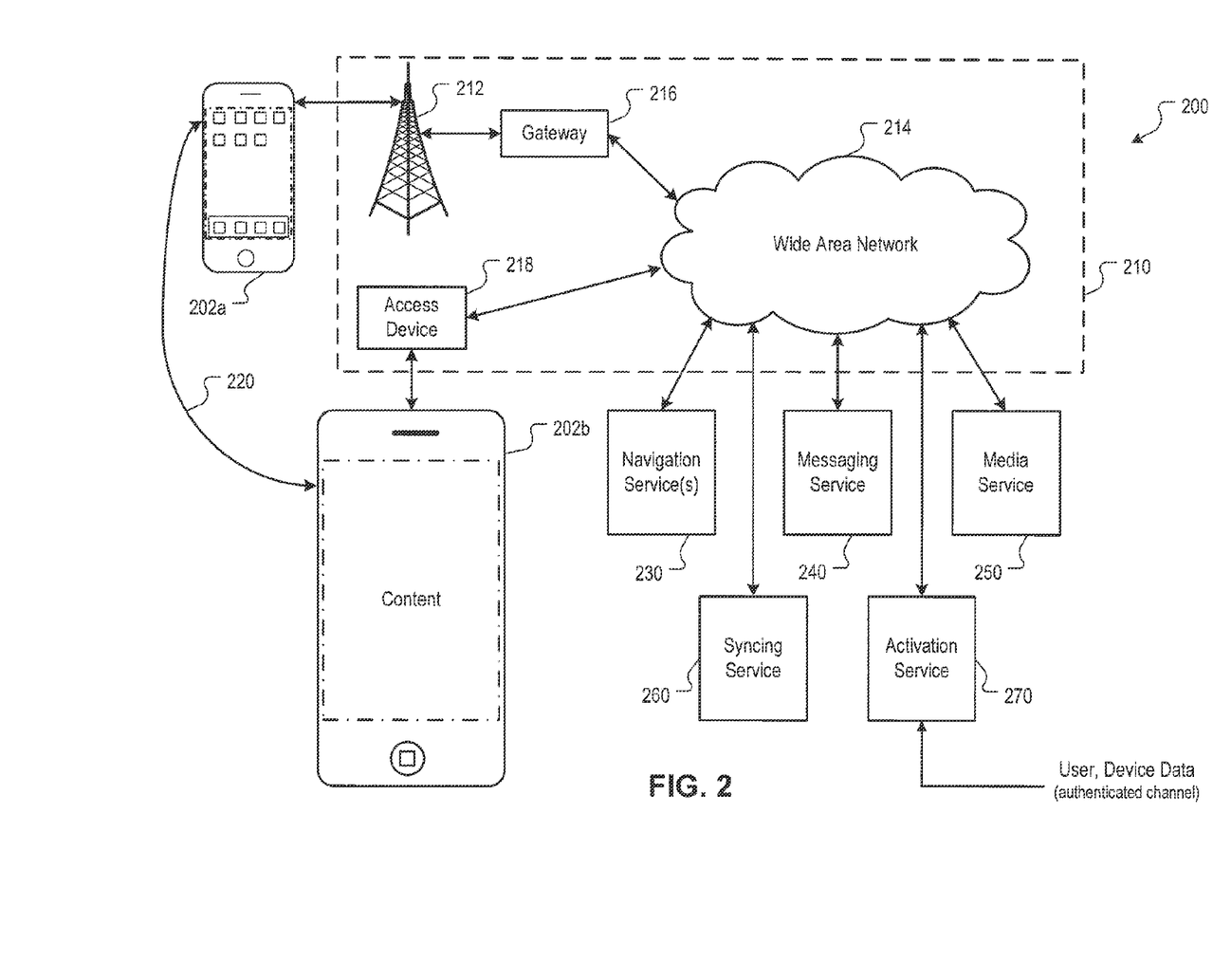
FIG. 2 is a block diagram of an example network operating environment for the mobile device of FIG. 1.

FIG. 2 is a block diagram of an example network operating environment 200 for the mobile device 100 of FIG. 1. Each of mobile devices 202a and 202b can be the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point device 218, such as an 802.11g wireless access point device, can provide communication access to the wide area network 214. In some implementations, both voice and data communications can be established over the wireless network 212 and the access point device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 202b can place and receive phone calls, send and receive e-mail messages, and retrieve electronic documents over the access point device 218 and the wide area network 214. In some implementations, the mobile device 100 can be physically connected to the access point device 218 using one or more cables and the access point device 218 can be a personal computer. In this configuration, the mobile device 100 can be referred to as a "tethered" device.

The mobile devices 202a and 202b can also establish communications by other means. For example, the wireless device 202a can communicate with other wireless devices, e.g., other wireless devices 100, cell phones, etc., over the wireless network 212. Likewise, the mobile devices 202a and 202b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 202b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100.

The mobile device 100 can also access other data and content over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Exemplary Mobile Device Architecture

Figure 3:
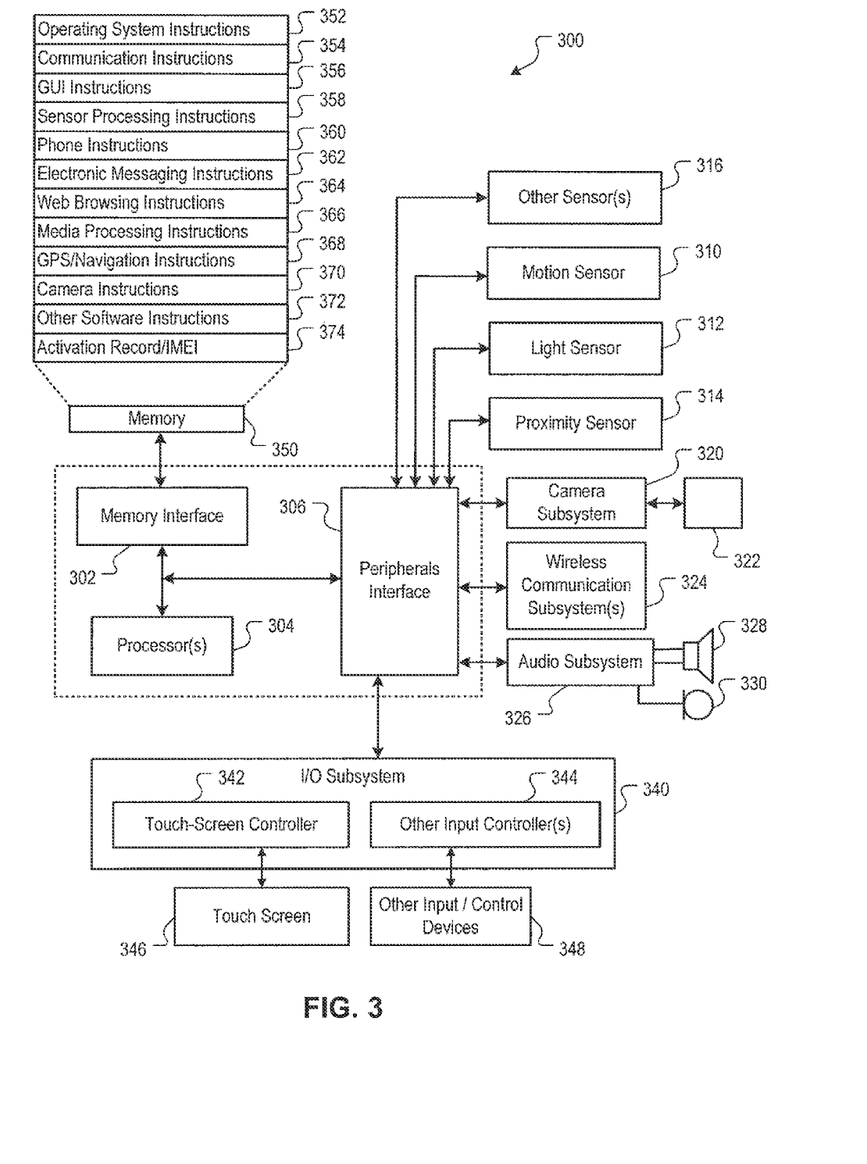
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

In some implementations, the mobile device can receive positioning information from a positioning system 318. The positioning system 318, in various implementations, can be located on the mobile device, or can be coupled to the mobile device (e.g., using a wired connection or a wireless connection). In some implementations, the positioning system 318 can include a global positioning system (GPS) receiver and a positioning engine operable to derive positioning information from received GPS satellite signals. In other implementations, the positioning system 318 can include a compass and an accelerometer, as well as a positioning engine operable to derive positioning information based on dead reckoning techniques. In still further implementations, the positioning system 318 can use wireless signals (e.g., cellular signals, IEEE 802.11 signals, etc) to determine location information associated with the mobile device, such as those provided by Skyhook Wireless, Inc. of Boston, Mass. Hybrid positioning systems using a combination of satellite and television signals, such as those provided by Rosum Corporation of Mountain View, Calif., can also be used. Other positioning systems are possible.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some embodiments, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions.

The memory 350 can also include a preferences engine 374. The preferences engine 374 can be operable to receive user preferences as to the sorts of content the user is interested. In some implementations, the preferences can be used to filter the sorts of information that is sent to the mobile device 100. For example, the user might indicate a preference for local music. Thus, when local music is available the mobile device 100 can retrieve available local music. In another example, the user might indicate a preference not to receive video, route or image content when in a specified area (e.g., hometown, familiar city, etc.), but to receive route and image content when outside of their specified area. These preferences can be communicated to a media service (e.g., media service 250 of FIG. 2), and can be used by the media service to provide relevant media content based on location and/or preferences.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Location Specific Content

Figure 4A:
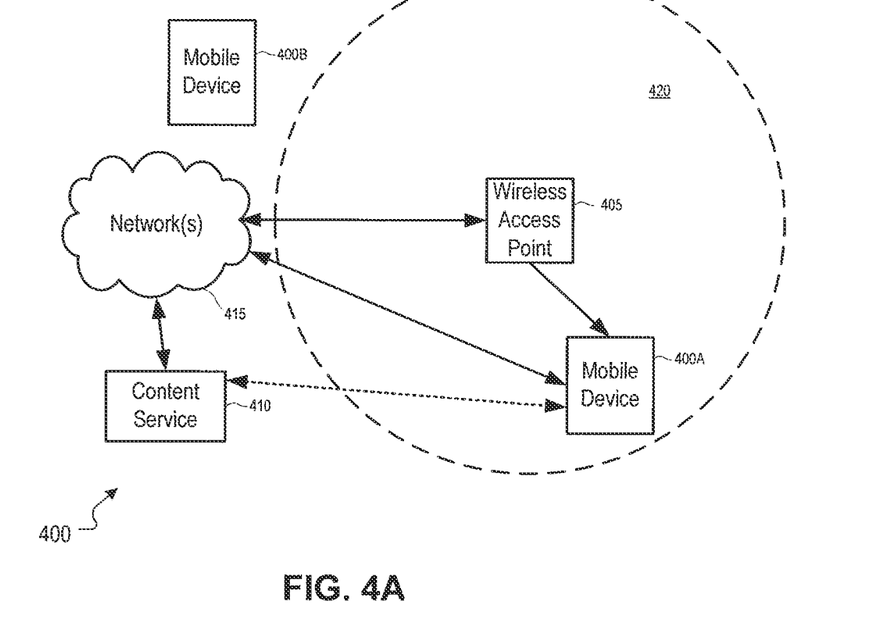
FIG. 4A is a block diagram illustrating an example system for delivering location-specific applications to a mobile device.

FIG. 4A is a block diagram illustrating an example system 400 for delivering location-specific content, such as location-specific applications, to one or more mobile devices, such as the mobile device 100 described with respect to FIGS. 1-3. The system 400 includes a wireless access point (WAP) 405 that permits wireless communication devices, such as a mobile device 400A, to connect to a wireless network using Wi-Fi, Bluetooth and/or other well known standards. Wireless devices can connect to the wireless network when they are within range of the WAP 405, i.e., they can receive signals from and communicate with the WAP 405. The WAP 405 can connect to one or more other network(s) 415, such as a wired network, and can relay data between mobile devices and the one or more networks 415. Additionally, a content service 410 may be in communication with the WAP 405 and/or mobile device 400A within range of the WAP 405 through the one or more networks 415.

As shown in FIG. 4A, the WAP 405 transmits wireless signals such that devices within a surrounding geographic area 420 can communicate with the WAP 405. For instance, a first mobile device 400A that is located within the geographic area 420 in range of (i.e., capable of communicating with) the WAP 405 can communicate with the WAP 405, while a second mobile device 400B outside of the geographic area 420 cannot. According to some implementations, the WAP 405 can represent a Wi-Fi access point, such that the geographic area 420 represents a hotspot. According to some implementations, the WAP 405 permits unrestricted, public access to mobile devices, such as free hotspots made available at a restaurant, airport, and the like. In other implementations the WAP 405 is restricted such that some authentication is required using known network security processes before a mobile device can communication through the WAP 405.

According to some implementations, a mobile device, such as the mobile device 400A located within the geographic area 420, can automatically display new content, including icons representing web clips, on mobile devices when the devices enter and/or remain in the geographic area 420. Similarly, such content may disappear from mobile devices when devices exit the geographic area 420. Thus, the display of content on a mobile device can be location dependent, where the location may be defined as within range of (i.e., capable of communicating with) the WAP 405. According to some implementations the content is provided by the WAP 405. Content can also be pushed and/or retrieved from the content service 410 to mobile devices in communication with the WAP 405.

In some implementations, content can be included in beacon data broadcast from the WAP 405 to mobile devices within the geographic area 420 of the WAP 405. Beacon data from WAPs generally includes a data transmission including a service set identifier (SSID), channel number, and security protocols such as WEP (Wired Equivalent Protection) or WPA (Wi-Fi Protected Access). Beacon data can also include a URL. The beacon data can be received by any mobile device, such as the mobile device 400A shown in FIG. 4A, that is within the geographic area 420 that acts as a client device.

A URL received by a mobile device from a WAP 405 in beacon data can be used by an application on a mobile device, such as a web browser, to automatically lookup the web site identified by the URL. In some implementations, subsequent to receiving the URL, the mobile device can communicate with and examine the web site to identify a site-based icon file that can be used as art to display an icon representing the content. A screen shot of the URL could also be scaled down when a site-based icon file is not available. According to yet another implementation, the icon image could be transmitted to the mobile device from the WAP 405.

The mobile device can create a new storage location on the mobile device in which to store information associated with the URL, including, for instance, the icon and the URL. The name of the content can also be stored on the device. Content identified by the URL received via the beacon can automatically appear on the mobile device. The content is selectable by a user of the device, such as by touching, tapping or otherwise selecting the content. Additional content downloaded from the URL, such as from the content service 410, can also be stored in the new storage location.

Figure 5A:
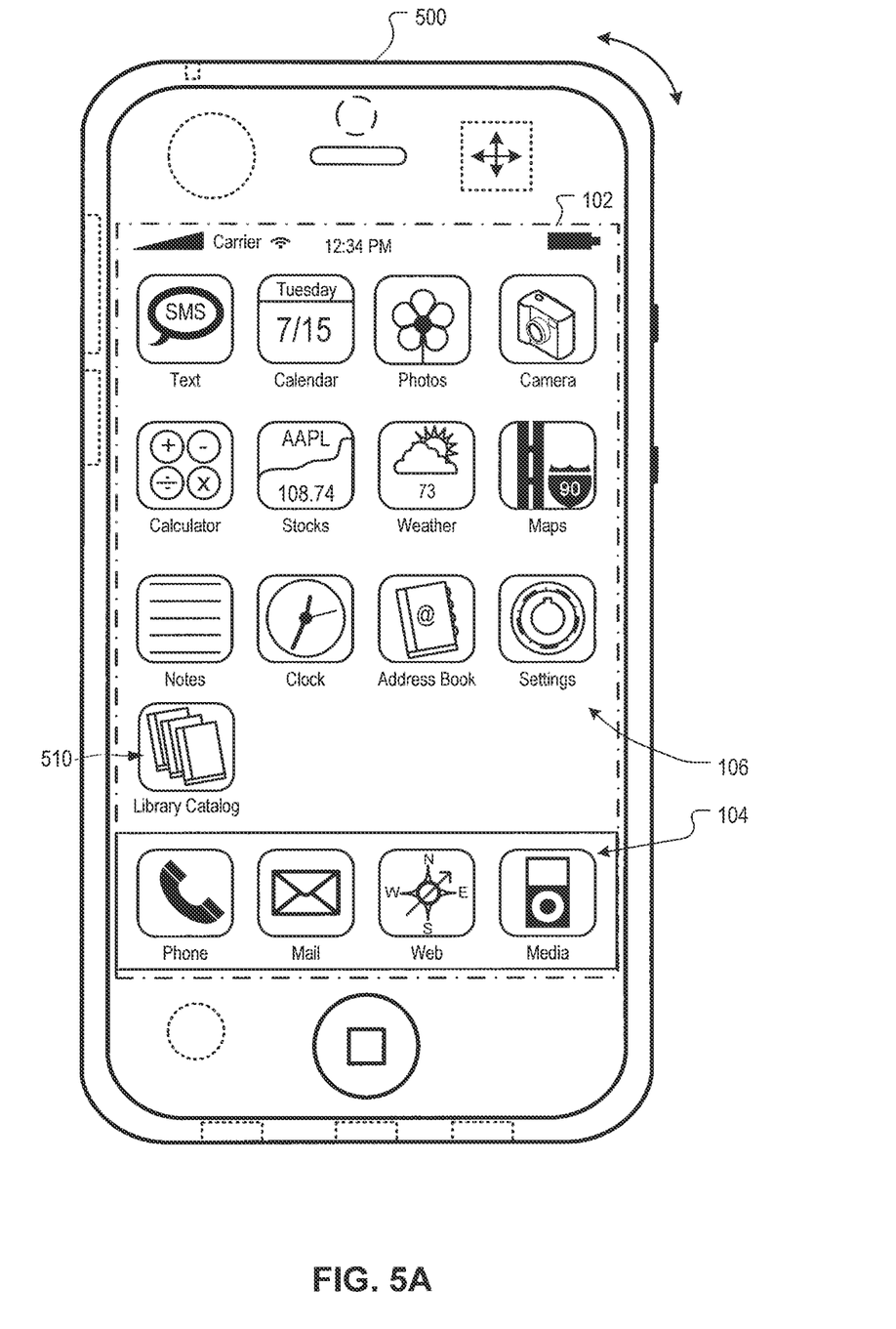
FIG. 5A is a block diagram of an example mobile device.

An example mobile device 500 which includes content 510 identified by a URL received via beacon data is shown in FIG. 5A. The content in FIG. 5 includes an icon 510, which is a display object on the touch sensitive display 102 of the mobile device. In the illustrative example of FIG. 5A, the content includes a user-selectable icon 510 corresponding to a library catalog. This could appear, for instance, on the mobile device 500 when carried by a user into a library having a WAP 405. When the icon 510 is selected, a library catalog application will launch on the mobile device 500 to permit a user of the mobile device to search the library catalog.

Referring again to FIG. 4A, in some implementations, a user can select an icon transmitted to a mobile device from the WAP 405, which in turn opens a link to the URL using, for instance, a web browser. According to some implementations, a user selection of an icon loads a web application. A web application is a browser-based application that can load in a web page or can be configured to look like an application rather than appearing to a user of the mobile device to load within a browser. In some implementations the URL identifies the content service 410. Therefore, upon selection of a URL provided by the WAP 405, a mobile device 400A can be directed to the content service 410, which can automatically download a content, such as an application, video content, picture content, audio content, multimedia content or routing content associated with a geographical area within a proximate distance to the mobile device based on the location information, and/or other media to the mobile device 400A for display to a user of the device. The content may be downloaded, as illustrated in FIG. 4A, from the content service to the mobile device 400A via the WAP 405. As shown by the dotted line in FIG. 4A, the content service 410 may also wirelessly transmit content directly to the mobile device 615. According to some implementations, a user may have to consent to the downloading of an application, or choose to download an application displayed as available on the display of the mobile device, prior to downloading occurring.

Content may be downloaded to and executed on mobile devices within the geographical area 420. Content can also remain on the content service 410 and be accessed by the mobile device 400A. For instance, content displayed on the mobile device 400A can represent web-based, hosted content viewable and/or executable on the mobile device. Therefore, location-specific content made available to mobile devices within the range of a WAP 405 can be hosted and/or stored at any accessible network location, including at the WAP 405, the content service 410, other network locations accessible from the network(s) 415, and/or on the mobile device 400A itself.

It will be appreciated that the transmission of a URL in beacon data from a WAP to a mobile device enables the identification of content to mobile devices within the range of the WAP 405 without requiring the system 400 to provide a database mapping location information of mobile devices to URLs or other content.

In the implementation shown in FIG. 4A, content will appear on a display of the mobile device 400A within the range of the WAP 405, and will disappear when the mobile device 400A leaves the geographic area 420. Thus, according to some implementations, storage on the mobile device 400A can retain a URL, icon, and other content only while the beacon data continues to be received at the device 400A from the WAP 405. The presence of the beacon data can be routinely confirmed by the mobile device. However, in some implementations a user can be queried to determine if the user wishes to permanently store content on the mobile device 400A even after the user departs the geographic area 420; if the WAP 405 and/or content service 410 consents to such permanent storage and use, the content can remain on the mobile device 400A.

Optionally, a user can define preferences on the mobile device that include information such as what type of content or from what sources a user associated with the mobile device is interested in receiving. Thus, the user can set up the mobile device to receive only certain kinds of content and/or content from certain types of content providers.

Additionally, although not described in detail herein, the loading of content can be effected over secure communication methods. Additionally, in some implementations, content downloaded to the mobile device 400A may require that the mobile device subsequently communicate with the content service 410, and those communications may be secure as well. The use of authentication processes may be required before accessing the WAP 405 and/or content service 410, and a certificate on the mobile device may be required. As an example, the geographic area 420 can represent the area within or around a retail store. Using the system 400, all customers may be able to view content identifying what products are on sale, while authenticated employees of the retail store could view inventory items.

Figure 4B:
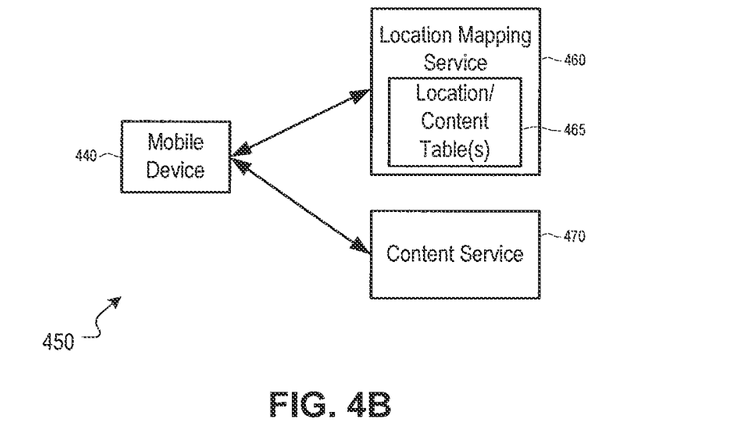
FIG. 4B is a block diagram of illustrating another example system for delivering location-specific applications to a mobile device.

FIG. 4B is a block diagram of illustrating another example system 450 for delivering location-specific applications to a mobile device 440. As described above, in some implementations, a mobile device 440 can receive positioning from a positioning system (not illustrated in FIG. 4B). Based on the location information identified by the positioning system, the mobile device 440 can receive location-specific content while the device is at or near a particular location identified by the location information. Thus, mobile devices need not be located near a wireless access point, such as the wireless access point 405 described with respect to FIG. 4A, to display location-specific content on the mobile device to a user.

According to some implementations, once location information for the mobile device is identified, content associated with the location of the device can be identified by a server that receives the location information from the device. The server can include a location mapping service 460. The location mapping service can include one or more databases that include one or more location/content tables 465 that correlate geographical locations to content to identify content, if any, that should be transmitted to the mobile device 440 while the device is at or near a particular location identified by the location information. For instance, the location/content tables could identify that content, such as text, images, and the like, associated with a national park should be transmitted to mobile devices that are located within the geographical area of the park or within a ¼ mile from the center of the park.

To effect the identification of content, the location mapping service 460 identifies the current location of a mobile device from location information, and compares the location information to geographical location data in the location/content tables 465 to determine if the location data satisfies, i.e., falls within, the geographical location data. Location information and geographical location data can be identified, for instance, using latitude and longitude data. Once the location information is determined by the location mapping service 460 to satisfy geographical location data, the location mapping service 460 identifies content corresponding to the satisfied geographical location data.

According to some implementations, the location/content tables 465 can identify URLs associated with location information. The service 460 can communicate the URLs to the mobile device 440, which can use the URLs to access content from a content service 470 in the same manner as described above in the system 400 of FIG. 4A. For instance, a browser on the mobile device 440 can use the URL to access a web page, and content thereon, provided by the content service 470.

Similar to the system 400 of FIG. 4A, content may also be presented only while the device is at or near a particular location identified by the location information. Therefore, location information can be routinely transmitted to the location mapping service, such as once every minute, five minutes, or on other intervals, to identify if the location of the mobile device 440 has changed. If so, the location mapping service can transmit a signal identifying new content to the mobile device and/or removing content from the mobile device that was previous received by the device 440. Other features of the system 450 may be similar to the system 400 described with respect to FIG. 4.

Figure 5B:
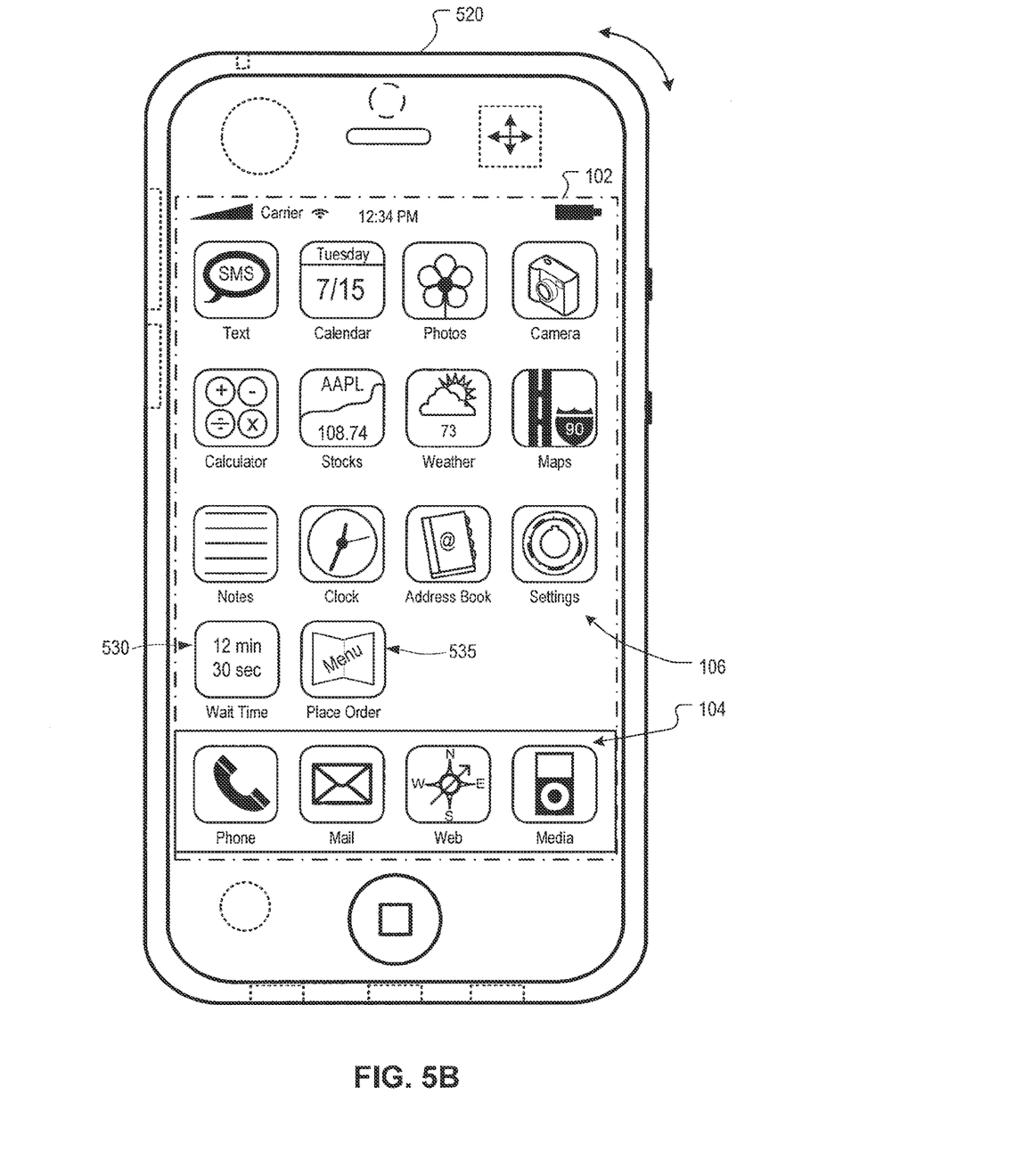
FIG. 5B is a block diagram of another example mobile device.

An example mobile device 520 that includes content identified in a database associated with a location of a mobile device is shown in FIG. 5B. The content 530, 535 in FIG. 5B includes icons, which is a display object on the touch sensitive display 102 of the mobile device. In the illustrative example of FIG. 5B, the content includes user-selectable icons 530, 535 corresponding to a timer and a menu. These icons could appear, for instance, when the mobile device 500 is in or near a restaurant. The user of the device may, for instance, view a seating wait time icon 530 that displays the estimated wait time before being seated. This may be displayed, for instance, where a user of the device provides a PIN, telephone number, or other identification information to a restaurant hostess, or alternatively, identifies that the user is waiting electronically using the mobile device. The place order icon 535 may be selected by a user of the device 520 to view and place an order for food electronically. For instance, the content service may include order software associated with the restaurant, which the user can access via the place order icon 535 to submit a food order electronically to the restaurant. Because these icons 530, 535 automatically appear on the device 520 when the user is at the restaurant, the user does not need to pre-configure and/or pre-download content to the device prior to arriving at the restaurant.

According to some implementations, a combination of the features of the systems 400, 450 described in FIGS. 4A and 4B may be used to effect the display of location-specific content on a mobile device. For instance, in the system of FIG. 4A a URL may not be transmitted to the mobile device 400A within the geographical area 420. Instead, the mobile device 400A may receive an icon via the beacon data, and subsequent o user selection of the icon, a URL can be identified by a lookup procedure that identifies the URL in a location/content database that associates the location information and/or identity of the WAP 405. For instance, the location of the WAP 405 may be stored in a database, which then associates content, such as a URL, with the WAP so that content specific to the location of the WAP is served to mobile devices in the vicinity of the WAP.

According to some implementation, mobile devices can be identified by the networks 415 using a zero configuration networking such as MDNS. The use of MDNS, for instance, would permit the mobile device to identify itself and connect to the network such that the content service can communicate with the mobile device. According to some implementations, a MDNS host could identify the location of content to a mobile device for retrieval and/or downloading by the mobile device. this could occur, for instance, if the mobile device has accessed a base station.

Example Methods For Presenting Location Specific Content

Figure 6:
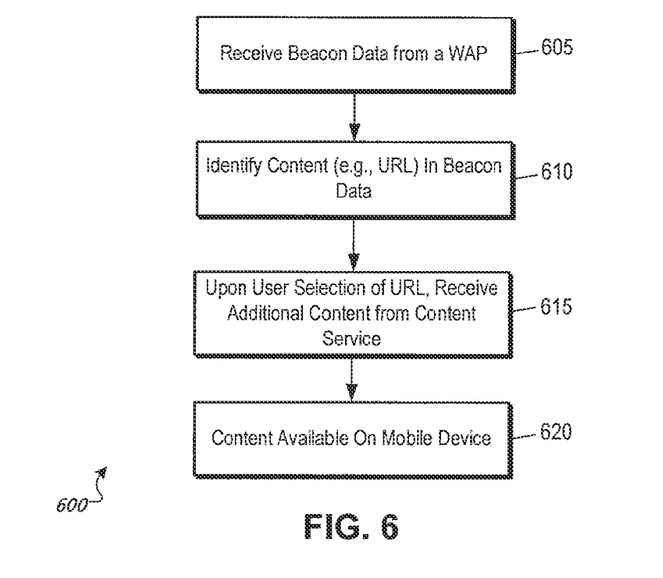
FIG. 6 is a flowchart illustrating an example method for presenting content on a mobile device.

FIG. 6 is a flowchart illustrating an example method for presenting content on a mobile device. In some implementations, each stage of the method occurs only while a mobile device is in communication, i.e., within the range of, a WAP, such as the WAP 405 shown in and described with respect to FIG. 4A.

In step 605, beacon data is received from a wireless access point 605 wirelessly by the device, such as the mobile device 100 in FIG. 1. Content within the beacon data, such as a URL, is identified by the mobile device 610. As an example, the WAP can provide one or more URLs to the mobile device in the beacon data, which may then be selected by a user and used by the mobile device to access additional content from a content service 615, such as content service 410, which is also operable to wirelessly transmit content that is received by the mobile device either directly or through a wireless access point. Content can be received, for example, by the mobile device (e.g., mobile device 100) operating in conjunction with communication instructions (e.g., communication instructions 354 of FIG. 3) and the wireless communication subsystem (e.g., wireless communication subsystem 324 of FIG. 3).

The received content is available, e.g., presented on a display of the mobile device 620, while the device is within the range of the WAP. The content can be presented, for example, by the mobile device (e.g., mobile device 100) operating in conjunction with graphical user interface instructions (e.g., GUI instructions 356 of FIG. 3) along with a touch screen (e.g., touch screen 346 of FIG. 3) and/or an audio subsystem (e.g., audio subsystem 326 of FIG. 3). The presentation of the content can be based upon user input received using the touch screen user interface.

Figure 7:
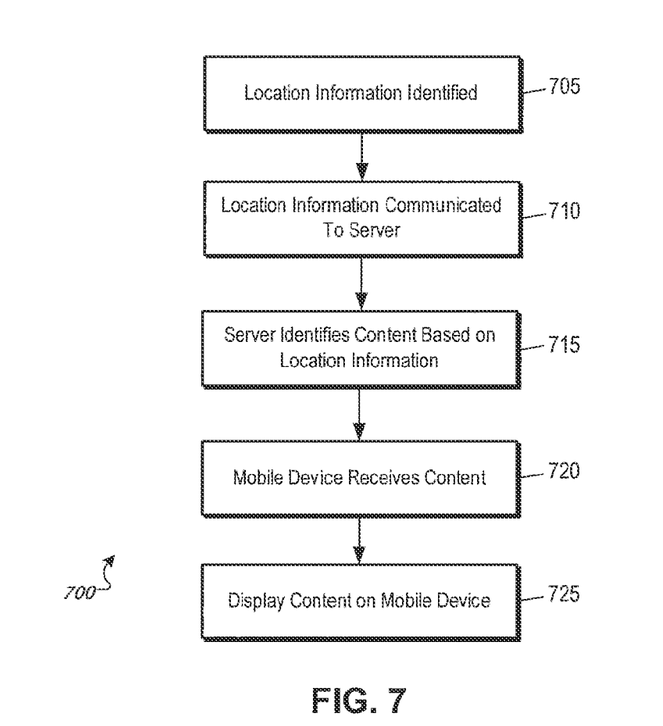
FIG. 7 is a flowchart illustrating another example method for presenting content on a mobile device.

FIG. 7 is a flowchart illustrating another example method 700 for presenting content on a mobile device. The process beings with the identification of location information 705, for instance, based on a positioning system (e.g., positioning system 318 of FIG. 3). The location information is the communicated to a server 710, for instance, the location mapping service 460 shown in FIG. 4B. The location information can be communicated, for example, by a mobile device (e.g., mobile device 100 of FIG. 1) using communication instructions (e.g., communication instructions 354 of FIG. 3) operating in conjunction with a wireless communication system (e.g., wireless communication subsystem 324 of FIG. 3).

The location information is used by the server, such as the location mapping service 460, to identify content 715 corresponding to geographical location data corresponding to the location of the mobile device as identified to the location information. For instance, content associated with the location of the mobile device may be identified in one or more databases, such as the location/content tables 465.

The server, for instance, the location mapping service 460, transmits content that may be received by the mobile device 720. As an example, the location mapping service 460 can provide one or more URLs to the mobile device, which may then be used by the mobile device to access additional content from a content service, which is also operable to wirelessly transmit content that is received by the mobile device 720. Content can be received 720, for example, by the mobile device (e.g., mobile device 100) operating in conjunction with communication instructions (e.g., communication instructions 354 of FIG. 3) and the wireless communication subsystem (e.g., wireless communication subsystem 324 of FIG. 3). In additional implementations not illustrated in FIG. 7, the mobile device can filter the content based on preferences, or one or more authentication procedures may be required to receive the content.

The received content is presented on a display of the mobile device 725 while the device is at or near a particular location identified by the location information. The content can be presented, for example, by the mobile device (e.g., mobile device 100) operating in conjunction with graphical user interface instructions (e.g., GUI instructions 356 of FIG. 3) along with a touch screen (e.g., touch screen 346 of FIG. 3) and/or an audio subsystem (e.g., audio subsystem 326 of FIG. 3). The presentation of the content can be based upon user input received using the touch screen user interface.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

The invention claimed is:

1. A method comprising:
   receiving, by a server, location information associated with a mobile device, the location identifying a location of the mobile device;
   identifying, by the server, content that comprises an application based on the location information, the application being associated with an icon, the icon being operable to, upon receiving an input, cause the application to be activated; and
   providing the content to the mobile device such that the icon is displayed only when location identified by the location information is at or near a particular location.

2. The method of claim 1, wherein the mobile device is a telephony device having a surface configured to receive a touch input.

3. The method of claim 1, wherein the mobile device is a base station configured to grant or deny network access of another mobile device.

4. The method of claim 1, wherein providing the content to the mobile device comprises providing the content as beacon data broadcast through a wireless access point.

5. The method of claim 1, comprising causing, by the server, the mobile device to remove the icon when the mobile device moves away from the particular location.

6. The method of claim 1, wherein:
   when the particular location is a library, the content includes a catalog of the library; or
   when the particular location is a restaurant, the content includes a menu provided by the restaurant, and the icon displays an estimated wait time at the restaurant.

7. A non-transitory storage device storing instructions operable to cause one or more processors to perform operations comprising:
   receiving, by a server, location information associated with a mobile device, the location identifying a location of the mobile device;
   identifying, by the server, content that comprises an application based on the location information, the application being associated with an icon, the icon being operable to, upon receiving an input, cause the application to be activated; and
   providing the content to the mobile device such that the icon is displayed only when location identified by the location information is at or near a particular location.

8. The non-transitory storage device of claim 7, wherein the mobile device is a telephony device having a surface configured to receive a touch input.

9. The non-transitory storage device of claim 7, wherein the mobile device is a base station configured to grant or deny network access of another mobile device.

10. The non-transitory storage device of claim 7, wherein providing the content to the mobile device comprises providing the content as beacon data broadcast through a wireless access point.

11. The non-transitory storage device of claim 7, the operations comprising causing, by the server, the mobile device to remove the icon when the mobile device moves away from the particular location.

12. The non-transitory storage device of claim 7, wherein:
   when the particular location is a library, the content includes a catalog of the library; or
   when the particular location is a restaurant, the content includes a menu provided by the restaurant, and the icon displays an estimated wait time at the restaurant.

13. A system, comprising:
   one or more processors; and
   a non-transitory storage device storing instructions operable to cause the one or more processors to perform operations comprising:
      receiving, by a server, location information associated with a mobile device, the location identifying a location of the mobile device;
      identifying, by the server, content that comprises an application based on the location information, the application being associated with an icon, the icon being operable to, upon receiving an input, cause the application to be activated; and
      providing the content to the mobile device such that the icon is displayed only when location identified by the location information is at or near a particular location.

14. The system of claim 13, wherein the mobile device is a telephony device having a surface configured to receive a touch input.

15. The system of claim 13, wherein the mobile device is a base station configured to grant or deny network access of another mobile device.

16. The system of claim 13, wherein providing the content to the mobile device comprises providing the content as beacon data broadcast through a wireless access point.

17. The system of claim 13, the operations comprising causing, by the server, the mobile device to remove the icon when the mobile device moves away from the particular location.

18. The system of claim 13, wherein:
when the particular location is a library, the content includes a catalog of the library; or
when the particular location is a restaurant, the content includes a menu provided by the restaurant, and the icon displays an estimated wait time at the restaurant.

* * * * *